United States Patent
Saeki et al.

(10) Patent No.: US 9,471,856 B2
(45) Date of Patent: Oct. 18, 2016

(54) METHOD AND APPARATUS FOR PROCESSING INFORMATION, AND COMPUTER-READABLE STORAGE MEDIUM

(71) Applicants: Nobuyuki Saeki, Tokyo (JP); Teruaki Takahashi, Kanagawa (JP)

(72) Inventors: Nobuyuki Saeki, Tokyo (JP); Teruaki Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/464,031

(22) Filed: Aug. 20, 2014

(65) Prior Publication Data

US 2015/0055156 A1  Feb. 26, 2015

(30) Foreign Application Priority Data

Aug. 23, 2013 (JP) ................. 2013-173199
Jul. 30, 2014 (JP) ................. 2014-155475

(51) Int. Cl.
*G06K 15/00* (2006.01)
*G06K 15/02* (2006.01)

(52) U.S. Cl.
CPC ....... *G06K 15/1848* (2013.01); *G06K 15/1822* (2013.01)

(58) Field of Classification Search
CPC ............. G06K 15/1846; G06K 15/1843; G06K 15/1847; G06K 9/00463; G06K 9/344; G06K 9/78; H04N 2201/3266

USPC ......................... 358/1.2, 1.11, 1.15
See application file for complete search history.

(56) References Cited

U.S. PATENT DOCUMENTS

| | | | |
|---|---|---|---|
| 6,009,196 A * | 12/1999 | Mahoney | .............. 382/176 |
| 6,952,803 B1 * | 10/2005 | Bloomberg | ......... G06F 17/211 382/186 |
| 2010/0315672 A1 | 12/2010 | Suzuki | |
| 2011/0051185 A1 | 3/2011 | Takahashi | |
| 2011/0058208 A1 | 3/2011 | Takahashi | |
| 2012/0008174 A1 * | 1/2012 | Sohma et al. | ........... 358/448 |
| 2013/0027744 A1 | 1/2013 | Takahashi | |
| 2014/0029033 A1 | 1/2014 | Takahashi | |

FOREIGN PATENT DOCUMENTS

JP  2011-002881  1/2011

* cited by examiner

*Primary Examiner* — Kent Yip
(74) *Attorney, Agent, or Firm* — Oblon, McClelland, Maier & Neustadt, L.L.P.

(57) ABSTRACT

An information processing apparatus for processing print data includes an extracting unit that extracts characters to be printed and coordinate information of the characters from the print data; an organizing unit that reorganizes the characters extracted by the extracting unit using the coordinate information of the characters; a sorting unit that sorts the characters extracted by the extracting unit into corresponding horizontal or vertical lines using the coordinate information of the characters; and a concatenating unit that concatenates the characters reorganized by the organizing unit and sorted by the sorting unit.

16 Claims, 11 Drawing Sheets

FIG.8

DISPLAY IMAGE

```
ABCDE
FGHIJ
```

PRINT DATA (EMF FORMAT)

```
RECORD 1 : TEXT="F" (x, y) = (X1, Y2)
RECORD 2 : TEXT="G" (x, y) = (X2, Y2)
RECORD 3 : TEXT="H" (x, y) = (X3, Y2)
RECORD 4 : TEXT="I" (x, y) = (X4, Y2)
RECORD 5 : TEXT="J" (x, y) = (X5, Y2)
RECORD 6 : TEXT="B" (x, y) = (X2, Y1)
RECORD 7 : TEXT="D" (x, y) = (X4, Y1)
RECORD 8 : TEXT="E" (x, y) = (X5, Y1)
RECORD 9 : TEXT="A" (x, y) = (X1, Y1)
RECORD 10 : TEXT="C" (x, y) = (X3, Y1)
```

```
TEXT="ABCDEFGHIJ"
```

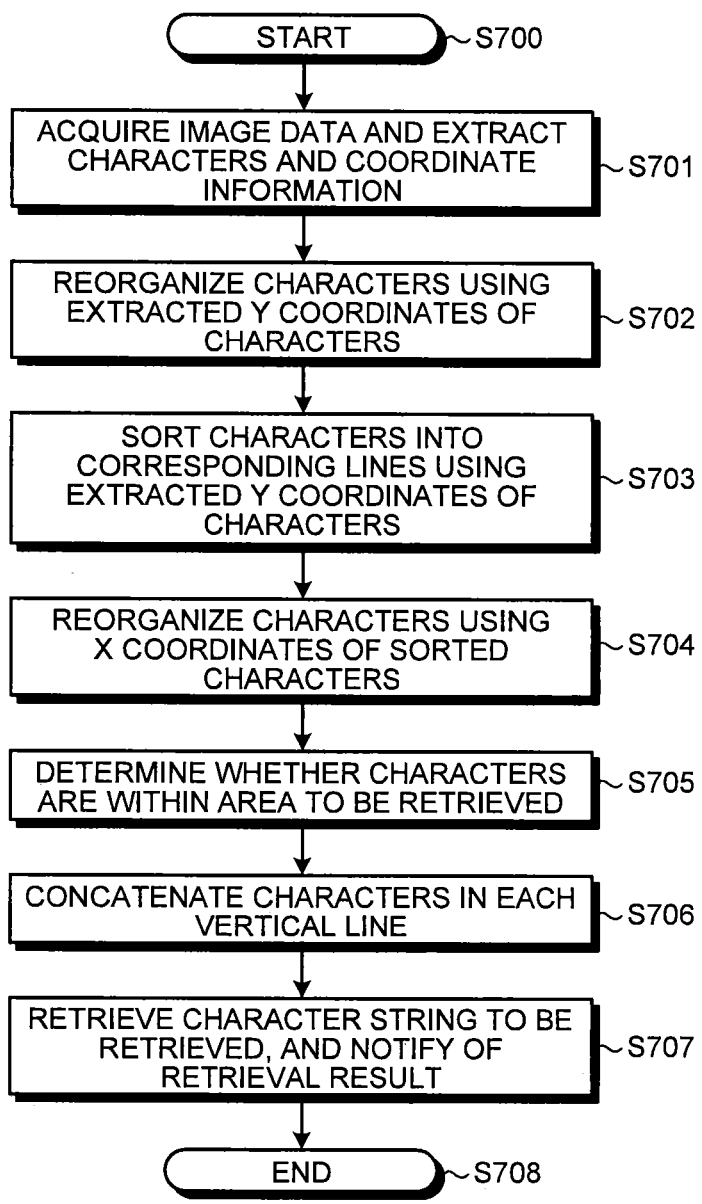

METHOD AND APPARATUS FOR PROCESSING INFORMATION, AND COMPUTER-READABLE STORAGE MEDIUM

CROSS-REFERENCE TO RELATED APPLICATIONS

The present application claims priority to and incorporates by reference the entire contents of Japanese Patent Application No. 2013-173199 filed in Japan on Aug. 23, 2013 and Japanese Patent Application No. 2014-155475 filed in Japan on Jul. 30, 2014.

BACKGROUND OF THE INVENTION

1. Field of the Invention

The present invention relates to a technology for controlling print data outputs, and more particularly to a method, an information processing apparatus, and a computer-readable storage medium that detect specific information from a piece of print data to process the print data.

2. Description of the Related Art

Information processing systems, which are a plurality of printers connected to a network, have been employed in organizations such as companies, government agencies, educational institutions, and hospitals. In such an information processing system, users designate one of the printers for executing a printing process before executing the printing.

For such an information processing system, some disclosures have been made on a technology that determines the conditions for outputting a piece of print data based on a piece of specific information extracted from the print data. For example, Japanese Patent Application Laid-open No. 2011-002881 discloses an information processing system that extracts character strings from a piece of print data in the enhanced metafile (EMF) format, detects a character string that matches a specific keyword, determining an output condition corresponding to the character string, and performs a process corresponding to the output condition, e.g., prints a watermark or replaces the characters.

The order of the characters included in print data in the EMF format is sometimes different from that in a display image of the print data, the display image representing an image actually to be printed on a paper sheet, as illustrated in FIG. 8, because the print data in the EMF format describes the characters in the order in which the characters are plotted by the application having generated the print data. The information processing system disclosed in Japanese Patent Application Laid-open No. 2011-002881, however, extracts a character string matching a keyword from a piece of print data in which the characters are ordered differently from those in the display image, that is, in which the characters are not reorganized yet. The information processing system is therefore incapable of detecting a keyword accurately.

Therefore, there is a need to provide a method, and an information processing apparatus, and a computer-readable storage medium capable of improving the accuracy of character string detection.

SUMMARY OF THE INVENTION

It is an object of the present invention to at least partially solve the problems in the conventional technology.

According to an embodiment, there is provided a non-transitory computer-readable storage medium with an executable program stored thereon and executed by a computer for processing print data. The program instructs the computer to perform: extracting characters to be printed and coordinate information of the characters from the print data; reorganizing the characters extracted at the extracting using the coordinate information of the characters; sorting the characters extracted at the extracting into corresponding horizontal or vertical lines using the coordinate information of the characters; and concatenating the characters reorganized at the reorganizing and sorted at the sorting.

According to another embodiment, there is provided a method for processing print data. The method includes extracting characters to be printed and coordinate information of the characters from the print data; reorganizing the characters extracted at the extracting using the coordinate information of the characters; sorting the characters extracted at the extracting into corresponding horizontal or vertical lines using the coordinate information of the characters; and concatenating the characters reorganized at the reorganizing and sorted at the sorting.

According to still another embodiment, there is provided an information processing apparatus for processing print data. The information processing apparatus includes an extracting unit that extracts characters to be printed and coordinate information of the characters from the print data; an organizing unit that reorganizes the characters extracted by the extracting unit using the coordinate information of the characters; a sorting unit that sorts the characters extracted by the extracting unit into corresponding horizontal or vertical lines using the coordinate information of the characters; and a concatenating unit that concatenates the characters reorganized by the organizing unit and sorted by the sorting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic illustrating a display image of a piece of print data, and the print data in the EMF format;

FIG. 9 is a schematic illustrating an example of a concatenation of character strings in a plurality of horizontal lines;

FIG. 13 is a flowchart illustrating a process performed by the keyword detecting unit according to the third embodiment.

DETAILED DESCRIPTION OF THE PREFERRED EMBODIMENTS

The present invention will now be explained using some embodiments, but the embodiments described hereunder are not intended to limit the scope of the present invention in any way.

First Embodiment

Figure 1:
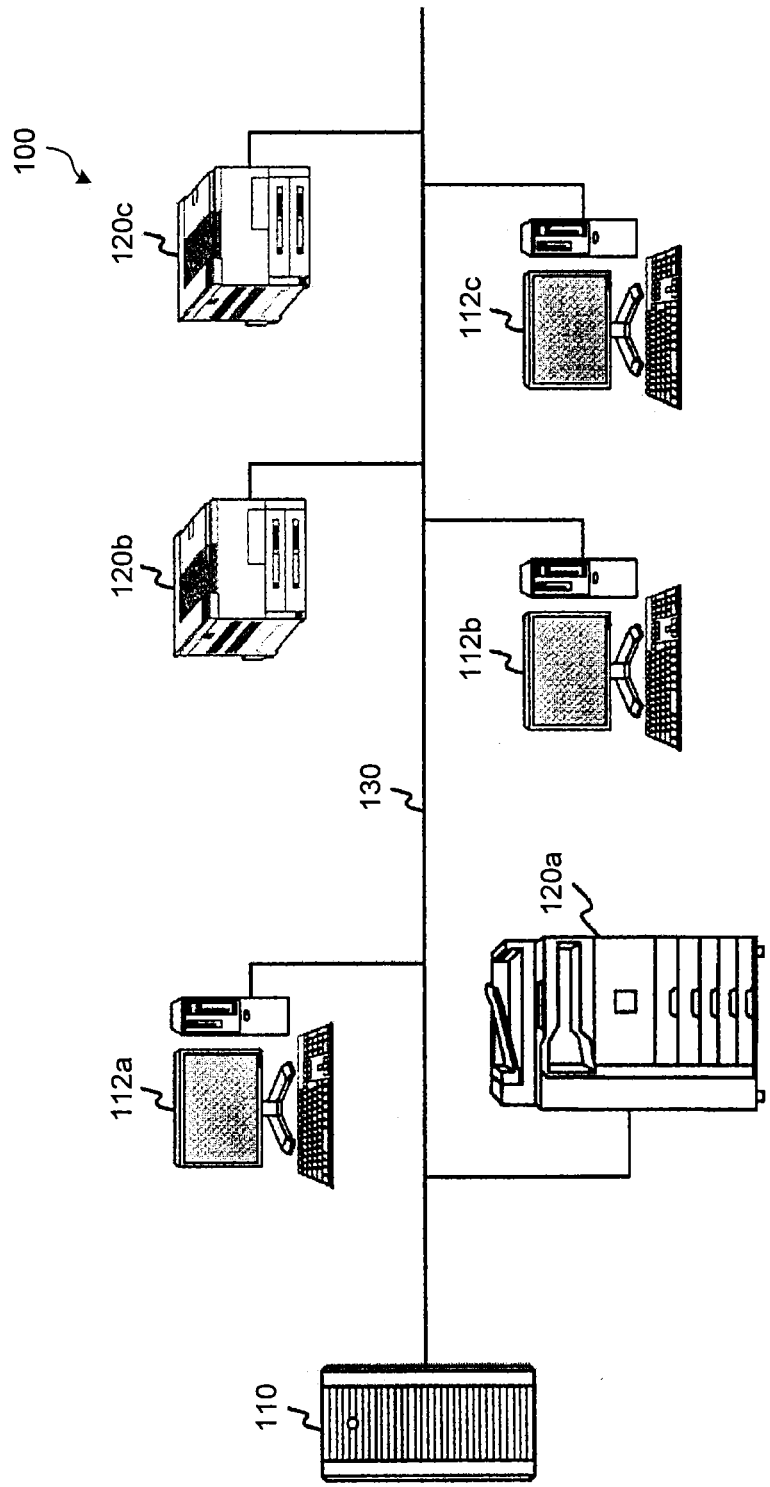
FIG. 1 is a schematic illustrating an embodiment of an information processing system according to the present invention.

FIG. 1 is a schematic of an embodiment of an information processing system according to the present invention. This information processing system 100 includes client personal computers (PCs) 112a, 112b, and 112c, a printer server 110, and printers 120a, 120b, and 120c all connected to each other over a network 130.

The client PCs 112a, 112b, and 112c are information processing apparatuses that transmit print data with a print request to the printer server 110, thereby causing the printer server 110 to execute the printing process. The client PCs 112a, 112b, and 112c are running applications capable of generating, editing, and displaying documents, graphs, diagrams, and the like, and transmit data generated by the applications to the printer server 110 as a piece of print data.

In the embodiment, various types of information processing apparatuses, including a desktop PC, a laptop PC, a tablet PC, and a smartphone, may be used as the client PCs 112a, 112b, and 112c. Various types of application software, such as word processing software, spreadsheet software, drawing software, and a document reader, may be used as the applications.

The printer server 110 is an information processing apparatus that determines which one of the printers is to execute printing based on a print request received from the client PCs 112a, 112b, and 112c, and transmits the print data to the printer, thereby causing the printer to output printouts.

The printers 120a, 120b, and 120c are apparatuses that output printouts by executing a printing process in response to an instruction received from the printer server 110. In the embodiment, various types of printers, including a multiple function printer (MFP) with a scanner, a laser printer, and an inkjet printer, may be used as the printers 120a, 120b, and 120c.

The network 130 is a network that may include an Ethernet (registered trademark) network, an optical network, and a wireless network. The network 130 may also include a wide area network deployed in a secure environment, such as an internet virtual private network (VPN), as well as local area networks (LANs).

The client PCs 112a, 112b, and 112c, the printer server 110, and the printers 120a, 120b, and 120c can communicate with each other over the network 130, via communications based on frames, Transmission Control Protocols/Internet Protocols (TCP/IP), or Remote Desktop Protocol (RDP).

Figure 2:
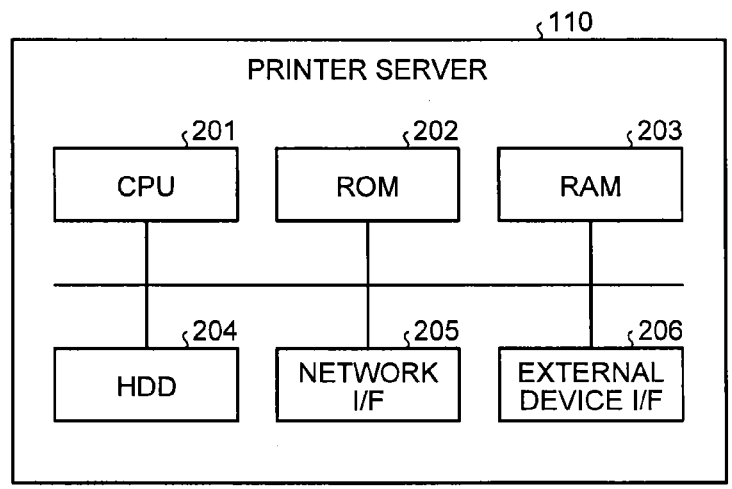
FIG. 2 is a schematic illustrating an embodiment of a hardware configuration of a printer server according to the present invention.

FIG. 2 is a schematic of an embodiment of a hardware configuration of the printer server according to the present invention. A hardware configuration of the printer server 110 will now be explained with reference to FIG. 2.

The printer server 110 includes a central processing unit (CPU) 201, a read-only memory (ROM) 202, a random access memory (RAM) 203, a hard disc drive (HDD) 204, a network interface (I/F) 205, and an external device I/F 206.

The CPU 201 is a processor that controls the operations of the printer server 110. The ROM 202 is a non-volatile storage device storing therein various types of data. The RAM 203 is a volatile storage device providing an area for executions of various computer programs, executed by the printer server 110. The HDD 204 is a storage device capable of storing therein various types of data persistently, including the computer program according to the present invention.

The network I/F 205 is a physical interface enabling the printer server 110 to communicate with the network 130. The external device I/F 206 is a physical interface allowing an external device such as a portable storage device, e.g., a universal serial bus (USB) memory, to be connected to the printer server 110.

The functions described later are implemented on the printer server 110 by causing the printer server 110 to read the computer program according to the present invention from the HDD 204, and to load and to execute the computer program on the RAM 203, under the management of an operation system (OS) of varying types, e.g., WINDOWS (registered trademark) series, Mac (registered trademark) OS, UNIX (registered trademark), and LINUX (registered trademark). The computer program according to the present invention may be described in various types of programming languages such as an assembly language, C, C++, JAVA (registered trademark), JAVA SCRIPT (registered trademark), PERL, RUBY, PYTHON, PHP, VISUAL BASIC (registered trademark), COBOL, and PL/SQL.

Figure 3:
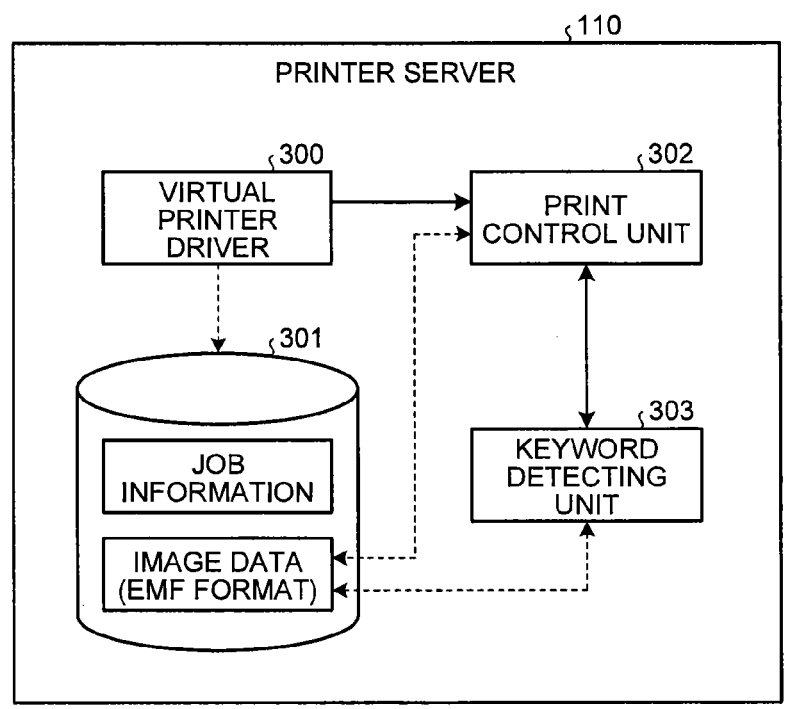
FIG. 3 is a block diagram illustrating functional configuration of the printer server according to a first embodiment of the present invention.

FIG. 3 is a block diagram illustrating a functional configuration of the printer server according to the first embodiment. A functional configuration of the printer server 110 will now be explained with reference to FIG. 3.

The printer server 110 includes a virtual printer driver 300, an intermediate data storage unit 301, a print control unit 302, and a keyword detecting unit 303.

The virtual printer driver 300 is a unit for creating intermediate data that is a page image from the print data provided from the client PCs 112a, 112b, and 112c. In the embodiment, the virtual printer driver 300 creates a piece of image data in the EMF format from the print data, and stores the image data as well as the job information appended to the print data in the intermediate data storage unit 301. The image data stored in the intermediate data storage unit 301 includes characters and the coordinate information of the characters.

The print control unit 302 is a unit for determining the printer to which the print data is to be output, and transmitting the print data to the printer. The print control unit 302 refers to the job information stored in the intermediate data storage unit 301, and transmits the print data to a printer associated with the user name of a print requestor, identification information unique to the client PC, print setting information (e.g., monochromatic print or color print), or the like included in the job information, and causes the printer to execute the printing process.

The print control unit 302 causes the keyword detecting unit 303 to retrieve a specific character string in the image data stored in the intermediate data storage unit 301. The print control unit 302 provides detection conditions such as a character string to be detected and an area to be retrieved to the keyword detecting unit 303 before causing the keyword detecting unit 303 to perform the retrieval.

Figure 4:
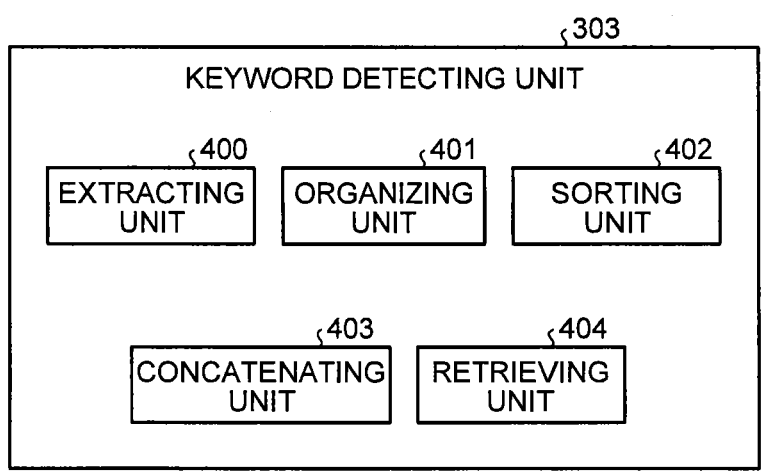
FIG. 4 is a schematic illustrating a functional configuration of a keyword detecting unit according to the first embodiment.

The keyword detecting unit 303 retrieves a specific character string from the image data that is the intermediate data, and notifies the print control unit 302 of the result, in response to an instruction from the print control unit 302. FIG. 4 is a schematic of a functional configuration of the keyword detecting unit 303 according to the first embodiment. The keyword detecting unit 303 includes an extracting unit 400, an organizing unit 401, a sorting unit 402, a concatenating unit 403, and a retrieving unit 404.

The extracting unit 400 is a unit for extracting characters to be printed and the coordinate information of the characters from the image data that is intermediate data. The extracting unit 400 acquires the image data from the intermediate data storage unit 301, and extracts characters found in the area to be retrieved that is specified as a detection condition, and extracts the coordinate information of the characters.

The organizing unit 401 is a unit for reorganizing the characters extracted from the image data. The organizing unit 401 reorganizes the characters using the X coordinates and Y coordinates of the characters, these coordinates provided as the coordinate information of the extracted characters.

The sorting unit 402 is a unit for sorting the characters extracted from the image data into corresponding horizontal or vertical lines. The sorting unit 402 sorts the characters into the corresponding horizontal lines with reference to the Y coordinates of the extracted characters. In the first embodiment, the extracted characters are sorted in the horizontal lines to process the character strings written horizontally, but the sorting unit 402 may sort the extracted characters into vertical lines using the X coordinate of the extracted characters, in another embodiment in which the character strings written vertically are processed.

The concatenating unit 403 is a unit for concatenating the characters extracted from the image data in each of the horizontal or vertical lines. In the embodiment, the concatenating unit 403 concatenates the characters in each of the horizontal lines, the characters having been sorted into the corresponding horizontal lines by the sorting unit 402, and having reorganized with reference to the X coordinates by the organizing unit 401. In another embodiment, the concatenating unit 403 concatenates the characters in each of the vertical lines, the characters having been sorted into the corresponding vertical lines by the sorting unit 402, and having reorganized with reference to the Y coordinates by the organizing unit 401.

The retrieving unit 404 is a unit for retrieving characters having been extracted from the image data. The retrieving unit 404 retrieves a character string to be detected specified as a detection condition from the character strings concatenated by the concatenating unit 403, and notifies the print control unit 302 of the retrieval result.

In the embodiment illustrated in FIG. 4, the functional units of the keyword detecting unit 303 are implemented on the printer server 110, but, in another embodiment, these functional units may be implemented on separate information processing apparatuses.

Figure 5:
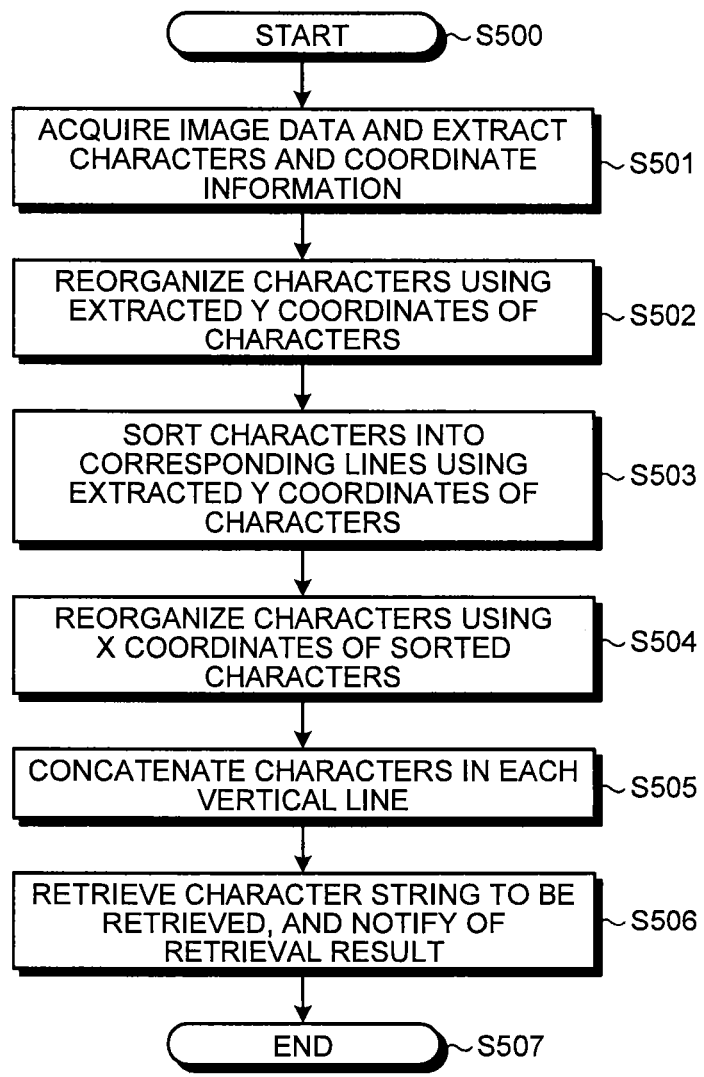
FIG. 5 is a flowchart illustrating a process performed by the keyword detecting unit according to the first embodiment.

FIG. 5 is a flowchart illustrating process performed by the keyword detecting unit 303 implemented on the printer server 110 according to the first embodiment. The keyword detecting process will now be explained with reference to FIG. 5.

The process illustrated in FIG. 5 starts at Step S500. At Step S501, the extracting unit 400 acquires a piece of image data from the intermediate data storage unit 301, and extracts the characters that are within the area to be retrieved that is specified as a detection condition, and the coordinate information of the characters. At Step S502, the organizing unit 401 reorganizes the characters using the Y coordinates of the respective characters, the Y coordinates being provided as the coordinate information of the extracted characters. At Step S503, the sorting unit 402 sorts the character into the corresponding horizontal lines using the Y coordinates of the respective extracted characters.

At Step S504, the organizing unit 401 reorganizes the characters having been sorted into the corresponding horizontal lines, using the X coordinates of the respective characters, the X coordinates being provided as the coordinate information of the characters. At Step S505, the concatenating unit 403 concatenates the characters in each of the horizontal lines, the characters having been reorganized at Step S504. At Step S506, the retrieving unit 404 retrieves a character string to be detected specified as a detection condition from the character strings concatenated at Step S505, and notifies the print control unit 302 of the retrieval result, and the process is ended at Step S507.

The process illustrated in FIG. 5 is a process performed when the character strings are written horizontally in the image data. When character strings are written vertically in the image data, the keyword detecting unit 303 reorganizes the characters using the X coordinates provided as the coordinate information, sorts the characters into the corresponding vertical lines, reorganizes the characters again using the Y coordinates, and concatenates the characters in each of the vertical lines.

Figure 6:
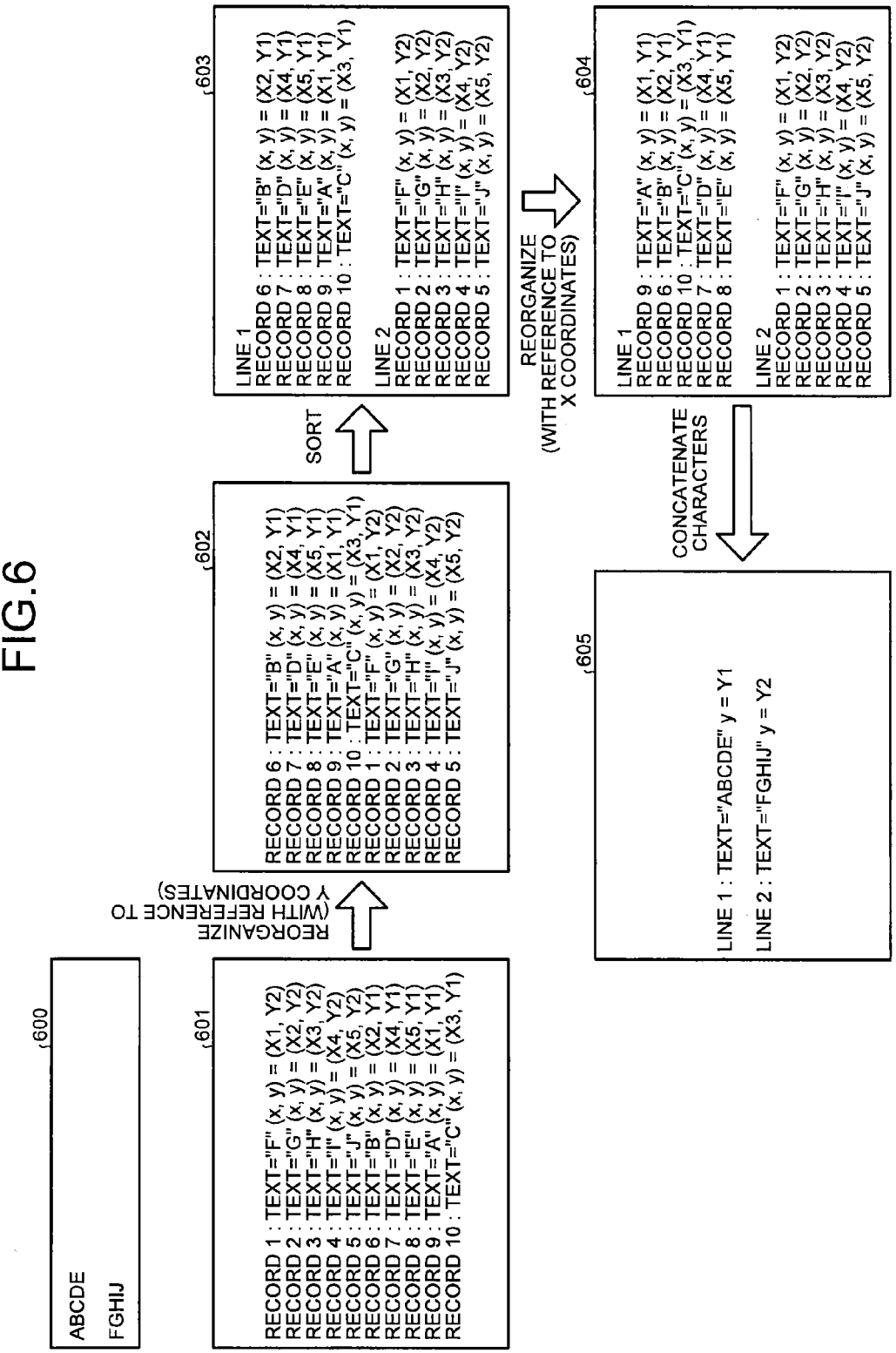
FIG. 6 is a conceptual schematic illustrating the process performed by the keyword detecting unit.

FIG. 6 is a conceptual schematic illustrating a process executed by the keyword detecting unit 303. The process executed prior to the keyword retrieval process will now be explained with reference to FIG. 6.

Retrieved information 601 represents characters and the coordinate information of the characters extracted from a piece of image data that is intermediate data by the keyword detecting unit 303. The retrieved information 601 includes a plurality of characters ("F", "G", "H", "I", "J", "B", "D", "E", "A", "C"), and the coordinate information of these characters. The keyword detecting unit 303 reorganizes the characters included in the retrieved information 601 with reference to the Y coordinates of the respective characters. In the embodiment illustrated in FIG. 6, the characters are reorganized in the ascending order of the Y coordinates.

The keyword detecting unit 303 then sorts the characters and the coordinate information included in retrieved information 602, having the characters and their coordinate information reorganized with reference to the Y coordinates, into the corresponding horizontal lines. In the embodiment illustrated in FIG. 6, the keyword detecting unit 303 determines that the characters with the same Y coordinate belong to the same horizontal line. In other words, the keyword detecting unit 303 determines that the characters having a Y coordinate of "1" ("B", "D", "E", "A", "C") belong to line 1, and determines that the characters having a Y coordinate of "2" ("F", "G", "H", "I", "J") belong to line 2.

The keyword detecting unit 303 then reorganizes the characters included in the retrieved information 603, having the characters and their coordinate information sorted into the corresponding horizontal lines, with reference to the X coordinates of the characters. In the embodiment illustrated in FIG. 6, the characters are reorganized in the ascending order of the X coordinates.

The keyword detecting unit 303 then generates retrieved information 605 by concatenating the characters in each of the horizontal lines in retrieved information 604 having the characters and their coordinate information reorganized in with reference to the X coordinates, and performs the keyword detecting process on the retrieved information 605. In the embodiment illustrated in FIG. 6, the keyword detecting unit 303 retrieves a character string of "ABCDE" in line 1 and a character string of "FGHIJ" in line 2. In this manner, the keyword detecting unit 303 can retrieve character strings arranged in the same order as in a display image 600, so that the accuracy of keyword detection can be improved.

Figure 7:
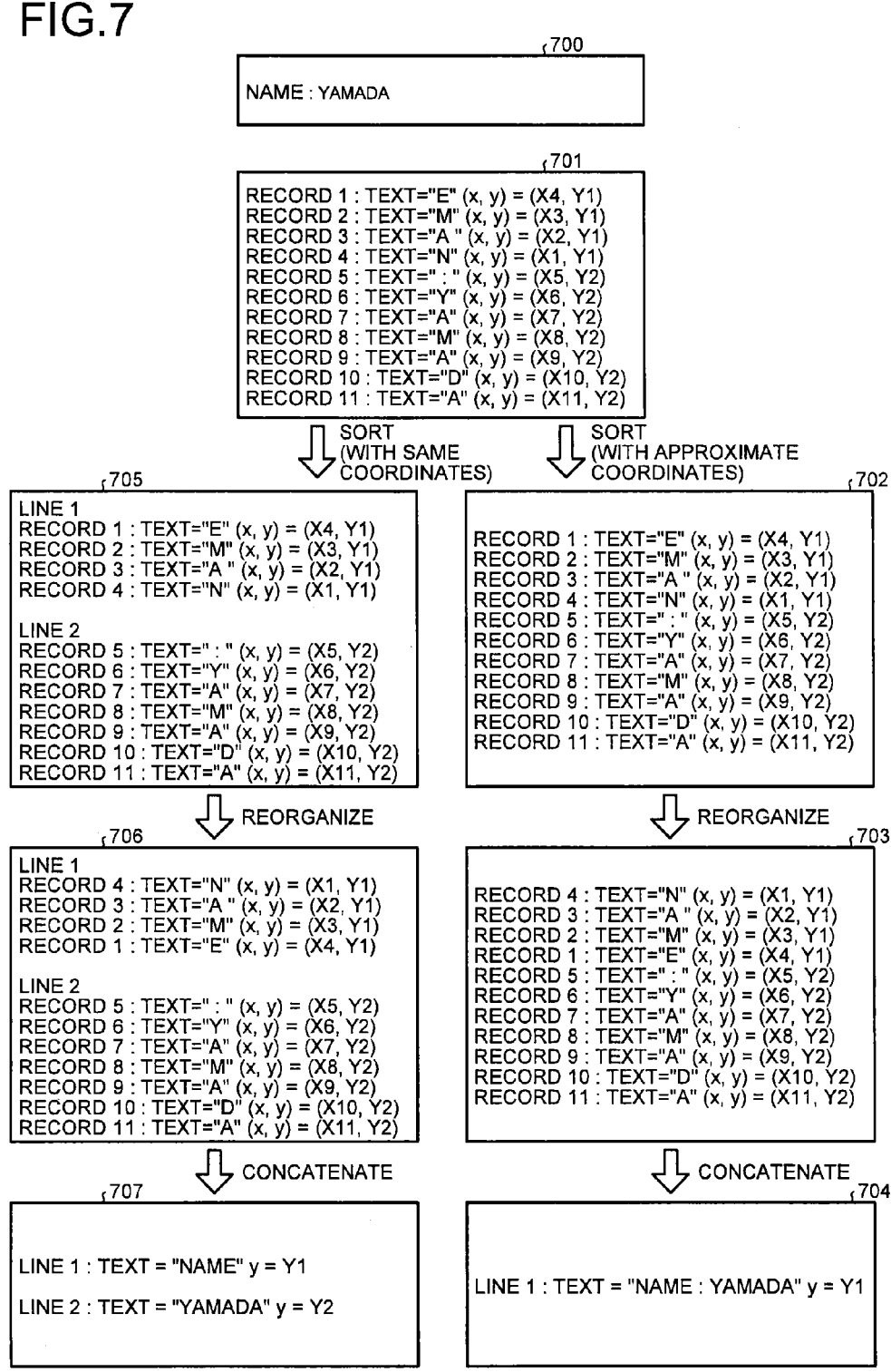
FIG. 7 is a schematic illustrating an embodiment of a retrieved information sorting process performed by the keyword detecting unit.

FIG. 7 is a schematic illustrating an embodiment of a retrieved information sorting process performed by the keyword detecting unit 303. The embodiment of the retrieved information sorting process will now be explained with reference to FIG. 7.

A display image 700 is an image output when the print data is actually printed out. In the display image 700, "NAME" are in bold characters and ":YAMADA" are in standard characters, and these two character strings are represented in the same horizontal line, but have different font sizes. Retrieved information 701 is retrieved information in which the characters are reorganized with reference to the Y coordinates. In the retrieved information 701, "N", "A", "M" and "E" that are bold characters have Y coordinate of "1", and ":", "Y", "A", "M", "A", "D", and "A" have a Y coordinate of "2". In the embodiment illustrated in FIG. 7, because the character string "NAME" and the character string ":YAMADA" have different character thicknesses and sizes, these character strings have different Y coordinates.

The keyword detecting unit 303 sorts the characters and the coordinate information included in the retrieved information 701 into the corresponding horizontal lines. Determining that the characters with the same Y coordinate belong to the same horizontal line, the character string "NAME" and the character string ":YAMADA" would be determined to belong to different horizontal lines, as illustrated as retrieved information 705, 706, and 707, and the keyword detecting unit 303 would be incapable of sorting the characters correctly. In the embodiment, therefore, the keyword detecting unit 303 refers to the Y coordinates of the respective characters and determines that characters belong to the same horizontal line if the difference between these Y coordinates is smaller than a predetermined value.

To explain specifically, in the embodiment illustrated in FIG. 7, because the difference between the Y coordinate "1" of the characters "N", "A", "M" and "E" and the Y coordinate "2" of the characters ":", "Y", "A", "M", "A", "D", and "A" is one, and is equal to or less than the predetermined value (e.g., 10), the keyword detecting unit 303 determines that these characters belong to the same horizontal line. The predetermined value is preferably any value that is likely to be taken by the difference between the Y coordinates of characters belong to the same horizontal line.

In the manner described above, in the first embodiment, when the keyword detecting unit 303 sorts the characters into the corresponding horizontal lines, the keyword detecting unit 303 determines that the characters with approximately the same Y coordinates belong to the same horizontal line, without determining that only the characters with the same Y coordinate belong to the same horizontal line. The keyword detecting unit 303 can therefore sort the characters correctly in a manner matching those in the display image 700, even when the characters in different sizes or thicknesses are written in the same horizontal line.

Presentation of the character strings in the respective horizontal lines (or the vertical lines), each of the character strings concatenated by the concatenating unit 403, is not limited to a plurality of character strings represented in the respective horizontal lines (or vertical lines), as illustrated in the retrieved information 605 in FIG. 6. For example, a plurality of character strings in the respective horizontal lines (or vertical lines) may be concatenated to one character string in one horizontal line (or vertical line), as illustrated in retrieved information 605a in FIG. 9. Such concatenation allows a keyword to be detected easily. Furthermore, the concatenating unit 403 does not need to concatenate all of a plurality of character strings, and may concatenate at least some of the character strings.

Second Embodiment

Figure 10:
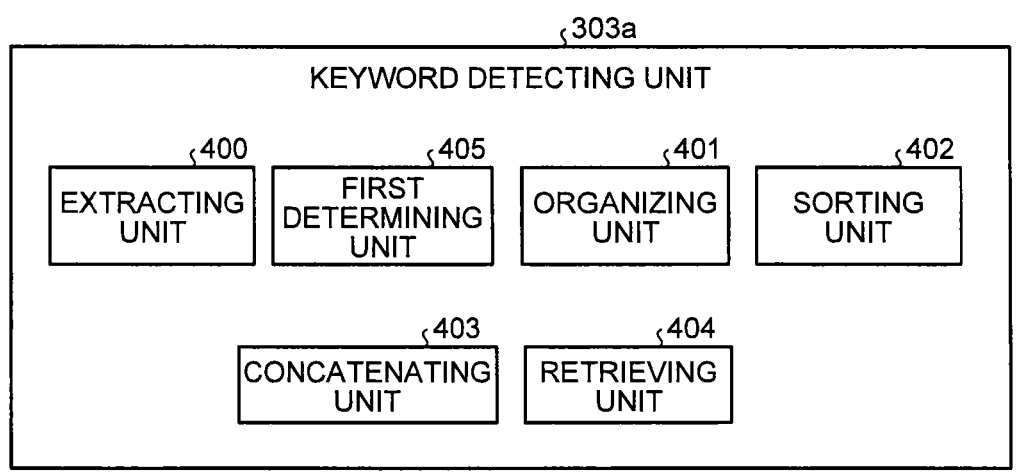
FIG. 10 is a schematic illustrating a functional configuration of a keyword detecting unit according to a second embodiment of the present invention.

An information processing system according to a second embodiment of the present invention will now be explained, focusing on the difference from the information processing system according to the first embodiment. The information processing system according to the second embodiment has the same configuration as the information processing system 100 illustrated in FIG. 1. The printer server 110 according to the second embodiment has the same hardware configuration as the printer server 110 illustrated in FIG. 2. The printer server 110 according to the second embodiment has the same functional configuration as the printer server 110 illustrated in FIG. 3, except that a keyword detecting unit 303a, which is described later, illustrated in FIG. 10 is provided instead of the keyword detecting unit 303. Explained in the second embodiment is an operation of determining whether the characters to be extracted from a piece of image data are written horizontally or vertically, before the characters are reorganized.

FIG. 10 is a schematic of a functional configuration of the keyword detecting unit according to the second embodiment. The functional configuration of the keyword detecting unit 303a according to the second embodiment will now be explained with reference to FIG. 10.

As illustrated in FIG. 10, the keyword detecting unit 303a according to the second embodiment includes an extracting unit 400, an organizing unit 401, a sorting unit 402, a concatenating unit 403, a retrieving unit 404, and a first determining unit 405. The operations of the extracting unit 400, the organizing unit 401, the concatenating unit 403, and the retrieving unit 404 according to the second embodiment are the same as those of the extracting unit 400, the organizing unit 401, the concatenating unit 403, and the retrieving unit 404, respectively, according to the first embodiment.

The sorting unit 402 is a unit for sorting the characters extracted from the image data into corresponding horizontal or vertical lines. The sorting unit 402 sorts the characters into the corresponding horizontal lines or vertical lines with reference to the Y coordinates or the X coordinates of the extracted characters, respectively.

The first determining unit 405 is a unit for determining if the characters to be printed extracted from the image data by the extracting unit 400 are written horizontally or vertically.

As illustrated in FIG. 10, the functional units of the keyword detecting unit 303a are implemented on the printer server 110, but these functional units may be implemented on separate information processing apparatuses.

Figure 11:
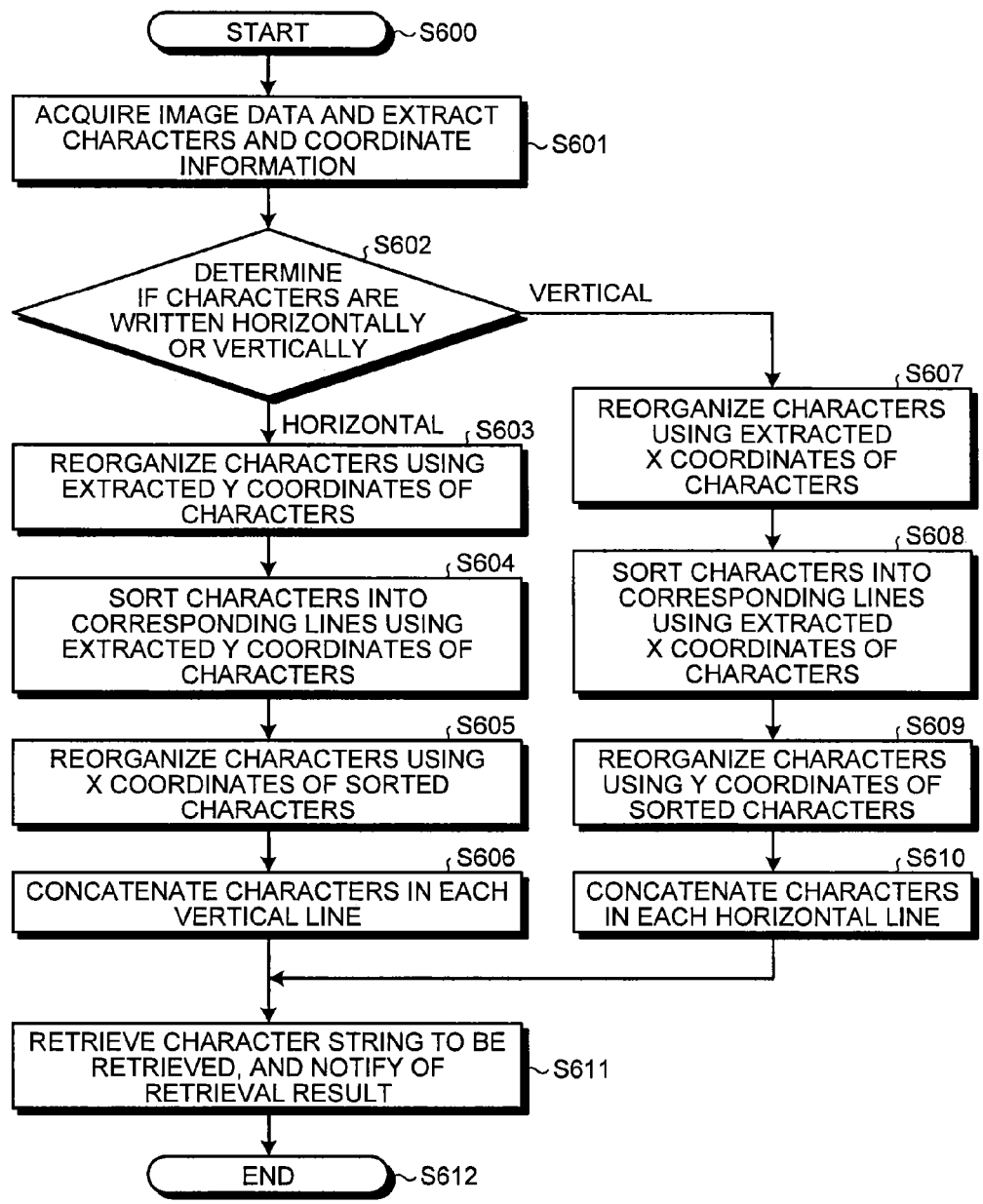
FIG. 11 is a flowchart illustrating a process performed by the keyword detecting unit according to the second embodiment.

FIG. 11 is a flowchart illustrating process performed by the keyword detecting unit according to the second embodiment. The keyword detecting process will now be explained with reference to FIG. 11.

The process illustrated in FIG. 11 starts at Step S600. At Step S601, the extracting unit 400 acquires a piece of image data from the intermediate data storage unit 301, and extracts the characters that are within the area to be retrieved that is specified as a detection condition, and the coordinate information of the characters. At Step S602, the first determining unit 405 determines whether the characters extracted by the extracting unit 400 are written horizontally or vertically. If the characters extracted by the extracting unit 400 are written horizontally (horizontal at Step S602), the system control goes to Step S603. If the characters extracted by the extracting unit 400 are written vertically (vertical at Step S602), the system control goes to Step S607.

At Step S603, the organizing unit 401 reorganizes the characters using the Y coordinates of the respective characters, the Y coordinates being provided as the coordinate information of the extracted characters. At Step S604, the sorting unit 402 sorts the character into the corresponding horizontal lines using the Y coordinates of the respective extracted characters.

At Step S605, the organizing unit 401 reorganizes the characters having been sorted into the corresponding horizontal lines, using the X coordinates of the respective characters, the X coordinates being provided as the coordinate information of the characters. At Step S606, the concatenating unit 403 concatenates the characters in each of the horizontal lines, the characters having been reorganized at Step S605.

At Step S607, the organizing unit 401 reorganizes the characters using the X coordinates of the respective characters, the X coordinates being provided as the coordinate information of the extracted characters. At Step S608, the sorting unit 402 sorts the characters into the corresponding vertical lines, using the extracted X coordinates of the characters.

At Step S609, the organizing unit 401 reorganizes the characters sorted into the corresponding vertical lines using the Y coordinates of the respective characters, the Y coordinates being provided as the coordinate information of the characters. At Step S610, the concatenating unit 403 concatenates the characters in each of the vertical lines reorganized at Step S609.

At Step S611, the retrieving unit 404 retrieves a character string to be detected specified as a detection condition from the character strings concatenated at Step S606 or Step S610, and notifies the print control unit 302 of the retrieval result, and the process is ended at Step S612.

As described above, in the second embodiment, the first determining unit 405 determines whether the characters to be printed extracted from a piece of image data by the extracting unit 400 are written horizontally or vertically, and the characters are reorganized and sorted into the corresponding horizontal or vertical lines based on the determination result. The characters are then reorganized using the X coordinates or Y coordinates, and the characters in each of the horizontal or vertical lines are concatenated. In this manner, regardless of whether a character string is written horizontally or vertically in the image data, the first determining unit 405 can determine if the character string is written in which direction, so that the retrieval can be performed in the character strings arranged in the same order as those in the display image. The keyword detection accuracy can therefore be further improved.

Third Embodiment

Figure 12:
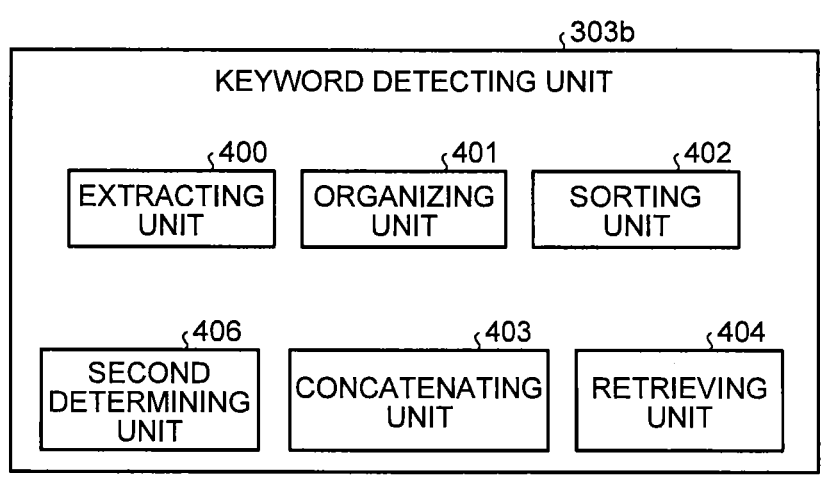
FIG. 12 is a schematic illustrating a functional configuration of a keyword detecting unit according to a third embodiment of the present invention.

The information processing system according to a third embodiment of the present invention will now be explained, focusing on the difference from the information processing system according to the first embodiment. The information processing system according to the third embodiment has the same configuration as the information processing system 100 illustrated in FIG. 1. The printer server 110 according to the third embodiment has the same hardware configuration as the printer server 110 illustrated in FIG. 2. The printer server 110 according to the third embodiment has the same functional configuration as the printer server 110 illustrated in FIG. 3, except that a keyword detecting unit 303b, which is described later, illustrated in FIG. 12 is provided instead of the keyword detecting unit 303. Explained in the third embodiment is an operation of concatenating only the characters in the area to be retrieved, among those extracted from a piece of image data, reorganized, and sorted.

FIG. 12 is a schematic of a functional configuration of the keyword detecting unit according to the third embodiment. The functional configuration of the keyword detecting unit 303b according to the third embodiment will now be explained with reference to FIG. 12.

As illustrated in FIG. 12, the keyword detecting unit 303b according to the third embodiment includes the extracting unit 400, the organizing unit 401, the sorting unit 402, the concatenating unit 403, the retrieving unit 404, and a second determining unit 406. The organizing unit 401, the sorting unit 402, and the retrieving unit 404 according to the third embodiment are the same as those of the organizing unit 401, the sorting unit 402, and the retrieving unit 404 according to the first embodiment.

The extracting unit 400 is a unit for acquiring a piece of image data that is intermediate data from the intermediate data storage unit 301, and extracting characters to be printed and the coordinate information of the characters from the image data.

The second determining unit 406 is a unit for determining if the characters reorganized by the organizing unit 401 and sorted by the sorting unit 402 are within the area to be retrieved, specified as a retrieval condition.

The concatenating unit 403 is a unit for concatenating characters determined to be in the area to be retrieved in the units of a horizontal or vertical line, such a determination made by the second determining unit 406, among those extracted from the image data. For example, the concatenating unit 403 concatenates the characters in the area to be retrieved in the units of a horizontal line, among the characters sorted into the corresponding horizontal lines by the sorting unit 402 and reorganized with reference to the X coordinates by the organizing unit 401.

As illustrated in FIG. 12, the functional units of the keyword detecting unit 303b are implemented on the printer server 110, but these functional units may be implemented on separate information processing apparatuses.

FIG. 13 is a flowchart illustrating a process performed by the keyword detecting unit according to the third embodiment. This keyword retrieval process will now be explained with reference to FIG. 13.

The process illustrated in FIG. 13 starts at Step S700. At Step S701, the extracting unit 400 acquires a piece of image data from the intermediate data storage unit 301, and extracts the characters to be printed and the coordinate information of the characters from the image data. At Step S702, the organizing unit 401 reorganizes the characters using the Y coordinates of the respective characters, the Y coordinates being provided as the extracted coordinate information of the characters. At Step S703, the sorting unit 402 sorts the characters into the corresponding horizontal lines using the extracted Y coordinates of the characters.

At Step S704, the organizing unit 401 reorganizes the characters having been sorted into the corresponding horizontal lines, using the X coordinates of the respective characters, the X coordinates being provided as the coordinate information of the characters. At Step S705, the second determining unit 406 determines whether the characters reorganized at Step S704 are within the area to be retrieved specified as a retrieval condition. At Step S706, the concatenating unit 403 concatenates the characters determined to be within the area to be retrieved at Step S705, in the units of a horizontal line. At Step S707, the retrieving unit 404 retrieves a character string to be detected specified as a detection condition from the character strings concatenated at Step S706, and notifies the print control unit 302 of the retrieval result, and the process is ended at Step S708.

The process illustrated in FIG. 13 is a process performed when the character strings are written horizontally in the image data. When character strings are written vertically in the image data, the keyword detecting unit 303 reorganizes the characters using the X coordinates provided as the coordinate information, sorts the characters into the corresponding vertical lines, reorganizes the characters again using the Y coordinates, and concatenates the characters in each of the vertical lines.

In the manner described above, in the third embodiment, the second determining unit 406 determines whether the characters reorganized by the organizing unit 401 and sorted by the sorting unit 402 are within the area to be retrieved specified as a retrieval condition, and the concatenating unit 403 concatenates the characters determined to be within the area to be retrieved. In this manner, only the characters that are within a specified area to be retrieved are concatenated, without concatenating the characters in each of the horizontal or vertical lines for all of the character strings written in the image data, and a keyword is retrieved from the concatenations, so that keyword detection efficiency can be improved.

The extracting unit 400, the organizing unit 401, the sorting unit 402, the concatenating unit 403, the retrieving unit 404, the first determining unit 405, and the second determining unit 406 according to the embodiments described above may be partially or entirely implemented as a hardware circuit, instead of a computer program being a piece of software.

When at least one of the extracting unit 400, the organizing unit 401, the sorting unit 402, the concatenating unit 403, the retrieving unit 404, the first determining unit 405, and the second determining unit 406 according to the embodiments is implemented by execution of a computer program, the computer program is provided in a manner embedded in the ROM 202 in advance. The computer program executed on the printer server 110 may be recorded and provided in a computer-readable storage medium such as a compact disc read-only memory (CD-ROM), a flexible disk (FD), a compact disc recordable (CD-R), and a digital versatile disc (DVD), as an installable or executable file. The computer program executed on the printer server 110 may be stored in a computer connected to a network such as the Internet, and made available for download over the network. The computer program executed on the printer server 110 may be provided or distributed over a network such as the Internet. The computer program executed on the printer server 110 has a modular structure including at least one of the extracting unit 400, the organizing unit 401, the sorting unit 402, the concatenating unit 403, the retrieving unit 404, the first determining unit 405, and the second determining unit 406. As actual hardware, by causing the CPU 201 to read the computer program from the ROM 202 or the HDD 204, for example, and to execute the computer program, the functional units described above are loaded and generated on the main memory.

According to the embodiments, use of the units described above allows characters to be retrieved to be reorganized in the same arrangement as those in a display image, so that the accuracy of character string detection can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable storage medium with a program stored thereon and executed by a computer for processing print data, the program instructing the computer to perform a method, the method comprising:
   extracting characters to be printed and coordinate information of the characters from the print data;
   reorganizing the characters extracted at the extracting using the coordinate information of the characters;
   grouping the reorganized characters into corresponding horizontal or vertical lines using the coordinate information of the characters;
   first concatenating the grouped characters into a plurality of character strings within the corresponding horizontal or vertical lines; and
   second concatenating the plurality of character strings in the corresponding horizontal or vertical lines into a single character string in one horizontal or vertical line.

2. The non-transitory computer-readable storage medium according to claim 1, wherein the grouping includes determining that the characters with same or approximately same X coordinates or Y coordinates represented in the coordinate information of the reorganized characters belong to a same horizontal or vertical line.

3. The non-transitory computer-readable storage medium according to claim 1, wherein the reorganizing includes reorganizing the extracted characters in a same order as the characters in a display image of the print data.

4. The non-transitory computer-readable storage medium according to claim 1, wherein:
   the method further includes determining whether the extracted characters are written horizontally or vertically,
   the reorganizing includes reorganizing the extracted characters based on a determination result of the determining,
   the grouping includes grouping the reorganized characters into corresponding horizontal or vertical lines based on the determination result, and
   the first concatenating includes concatenating the grouped characters based on the determination result.

5. The non-transitory computer-readable storage medium according to claim 1, wherein
   the method further includes determining whether the characters reorganized at the reorganizing and grouped by the grouping are within a specified area to be retrieved in the print data, and the first concatenating includes concatenating the characters determined to be within the specified area to be retrieved.

6. The non-transitory computer-readable storage medium according to claim 1, wherein the method further includes retrieving the single character string concatenated at the second concatenating.

7. The non-transitory computer-readable storage medium according to claim 1, wherein the first concatenation of the grouped characters is based on same X coordinates.

8. The non-transitory computer-readable storage medium according to claim 1, wherein the first concatenation of the grouped characters is based on same Y coordinates.

9. The non-transitory computer-readable storage medium according to claim 1, wherein the first concatenation of the grouped characters is based on same X coordinates or same Y coordinates.

10. A method for processing print data, the method comprising:
    extracting, by circuitry, characters to be printed and coordinate information of the characters from the print data;
    reorganizing, by the circuitry, the characters extracted at the extracting using the coordinate information of the characters;
    grouping, by the circuitry, the reorganized characters into corresponding horizontal or vertical lines using the coordinate information of the characters;
    first concatenating, by the circuitry, the grouped characters into a plurality of character strings within the corresponding horizontal or vertical lines; and
    second concatenating, by the circuitry, the plurality of character strings in the corresponding horizontal or vertical lines into a single character string in one horizontal or vertical line.

11. An information processing apparatus for processing print data, the information processing apparatus comprising:
    circuitry configured to:
        extract characters to be printed and coordinate information of the characters from the print data;
        reorganize the extracted characters using the coordinate information of the characters;
        group the reorganized characters into corresponding horizontal or vertical lines using the coordinate information of the characters;
        first concatenate the grouped characters into a plurality of character strings within the corresponding horizontal or vertical lines; and
        second concatenate the plurality of character strings in the corresponding horizontal or vertical lines into a single character string in one horizontal or vertical line.

12. The information processing apparatus according to claim 11, wherein the circuitry is further configured to determine that the characters with same or approximately same X coordinates or Y coordinates represented in the coordinate information of the reorganized characters belong to a same horizontal or vertical line.

13. The information processing apparatus according to claim 11, wherein the circuitry is further configured to reorganize the extracted characters in a same order as the characters in a display image of the print data.

14. The information processing apparatus according to claim 11, wherein
    the circuitry is further configured to:
        determine whether the extracted characters are written horizontally or vertically,
        reorganize the extracted characters based on a result of the determination, and
        group the reorganized characters into corresponding horizontal or vertical lines based on the determination result, and
    the first concatenation includes a concatenation of the grouped characters based on the determination result.

15. The information processing apparatus according to claim 11, wherein
    the circuitry is further configured to:
        determine whether the reorganized and grouped characters are within a specified area to be retrieved in the print data, and
    the first concatenation includes a concatenation of the characters determined to be within the specified area to be retrieved.

16. The information processing apparatus according to claim 11, wherein the circuitry is further configured to retrieve the single character string from the second concatenation.

* * * * *